United States Patent
Oesterling

(10) Patent No.: US 9,573,566 B2
(45) Date of Patent: Feb. 21, 2017

(54) SELECTIVE PASSIVE DOOR LOCK FUNCTIONS FOR VEHICLES

(71) Applicant: GM Global Technology Operations LLC, Detroit, MI (US)

(72) Inventor: Christopher L. Oesterling, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/643,606

(22) Filed: Mar. 10, 2015

(65) Prior Publication Data

US 2016/0264097 A1    Sep. 15, 2016

(51) Int. Cl.
*B60R 25/31*    (2013.01)
*B60R 25/20*    (2013.01)
*B60R 25/33*    (2013.01)

(52) U.S. Cl.
CPC ............... *B60R 25/31* (2013.01); *B60R 25/20* (2013.01); *B60R 25/2009* (2013.01); *B60R 25/33* (2013.01)

(58) Field of Classification Search
CPC ...... B60R 25/20; B60R 25/2009; B60R 25/31; B60R 25/33
See application file for complete search history.

(56) References Cited

U.S. PATENT DOCUMENTS

| | | | | |
|---|---|---|---|---|
| 3,725,939 A * | 4/1973 | Saltzstein | .......... | G07C 9/00182 361/172 |
| 4,486,806 A * | 12/1984 | Mochida | ............... | G07C 9/0069 361/172 |
| 4,763,121 A * | 8/1988 | Tomoda | ............. | G07C 9/00309 340/10.42 |
| 5,912,631 A * | 6/1999 | Kusunoki | .......... | G07C 9/00182 340/5.64 |
| 6,384,709 B2 * | 5/2002 | Mellen | ............... | G07C 9/00182 340/5.2 |
| 6,744,349 B1 * | 6/2004 | Asakura | ................ | B60R 25/245 340/5.64 |
| 6,937,138 B2 * | 8/2005 | Underdahl | .............. | B60R 25/04 340/5.64 |
| 7,539,565 B2 * | 5/2009 | McBride | ................. | B60R 25/33 701/36 |
| 7,844,377 B2 * | 11/2010 | Oota | ........................ | B60R 25/33 701/36 |

(Continued)

*Primary Examiner* — Dale W Hilgendorf
(74) *Attorney, Agent, or Firm* — Christopher DeVries; Reising Ethington P.C.

(57) ABSTRACT

A system and method of selectively carrying out a vehicle passive door lock function. The method carried out by the system includes: (a) detecting a vehicle operator's exit from a vehicle having at least one lockable door for passenger entry and exit, wherein the vehicle is configured to automatically carry out a passive operator departure process following the operator's exit, (b) determining whether the vehicle is at a lock function exempt location; (c) automatically carrying out the passive operator departure process in a first mode when it is determined that the vehicle is not at the exempt location; and (d) automatically carrying out the passive operator departure process in a second mode when it is determined that the vehicle is at the exempt location, wherein the second mode comprises at least one less door lock function than is carried out in the first mode.

16 Claims, 3 Drawing Sheets

(56) References Cited

U.S. PATENT DOCUMENTS

| | | | | |
|---|---|---|---|---|
| 8,095,267 B2* | 1/2012 | Mino | ...................... | B60R 25/33 |
| | | | | 701/36 |
| 8,314,680 B2* | 11/2012 | Ichihara | .................. | B60R 25/33 |
| | | | | 340/5.28 |
| 2006/0238314 A1* | 10/2006 | Minassian | ............... | B60R 25/24 |
| | | | | 340/426.13 |
| 2007/0216517 A1* | 9/2007 | Kurpinski | ............. | B60R 25/245 |
| | | | | 340/5.72 |
| 2009/0222200 A1* | 9/2009 | Link, II | ............ | G01C 21/3446 |
| | | | | 701/533 |
| 2010/0011821 A1* | 1/2010 | Kim | ........................ | E05B 41/00 |
| | | | | 70/264 |
| 2015/0057896 A1* | 2/2015 | Yamane | .................. | B60R 25/24 |
| | | | | 701/49 |
| 2015/0332530 A1* | 11/2015 | Kishita | ................ | B60R 25/245 |
| | | | | 70/256 |

* cited by examiner

SELECTIVE PASSIVE DOOR LOCK FUNCTIONS FOR VEHICLES

TECHNICAL FIELD

The present invention relates to vehicle passive entry systems in general and, more particularly, to methods and systems for carrying out passive door lock functions following exit of the vehicle operator.

BACKGROUND

Passive entry technology (PET) allows vehicle operators the ability to configure the vehicle to automatically lock and unlock at entry and exit, respectively. This eliminates the need for manual action by the operator such as pressing of the door unlock and lock buttons on the vehicle's remote control device. In a typical PET scenario, when the operator exits the vehicle and walks away carrying the vehicle's PET key or keyfob, the exit and/or departure of the keyfob from the vicinity of the vehicle is detected and used to automatically lock the vehicle if it is so configured. This may be accompanied by a confirmatory vehicle horn honk and/or flash of exterior vehicle lights to alert the operator that the vehicle did automatically lock successfully. Although the automatic locking and associated confirmatory alert is normally very useful, the inventors have discovered that there are some situations in which one or both of these features are not necessary or desired. For example, vehicle operators may not want their vehicle's horn to sound upon exiting their vehicle at their home or, when the vehicle is secure in their home garage, may not want the vehicle locked at all.

SUMMARY

It is thus an object of this invention to enable a vehicle operator to configure his or her vehicle to selectively carry out one or more door lock functions in a manner that is dependent upon conditions defined by the operator, such as vehicle location.

According to an embodiment of the invention, there is provided a method of selectively carrying out a vehicle passive door lock function. The method includes the steps of: (a) detecting a vehicle operator's exit from a vehicle having at least one lockable door for passenger entry and exit, wherein the vehicle is configured to automatically carry out a passive operator departure process in a first mode, wherein the first mode comprises one or more door lock functions that are carried out following the operator's exit, and wherein a first one of the door lock functions comprises automatically locking the vehicle door, and a second one of the door lock functions comprises automatically providing a notification indicating that the vehicle door has been automatically locked; (b) determining whether the vehicle is at a lock function exempt location; (c) automatically carrying out the passive operator departure process in the first mode when it is determined that the vehicle is not at the exempt location; and (d) automatically carrying out the passive operator departure process in a second mode when it is determined that the vehicle is at the exempt location, wherein the second mode comprises at least one less door lock function than is carried out in the first mode.

According to another embodiment of the invention, there is provided a method of configuring a vehicle for selectively carrying out a vehicle passive door lock function. The method includes the steps of: (a) receiving a first input instructing the vehicle to automatically carry out a passive operator departure process in a first mode, wherein the first mode comprises one or more door lock functions that are carried out following exit of an operator from the vehicle, wherein a first one of the door lock functions comprises automatically locking the vehicle door, and a second one of the door lock functions comprises automatically providing a notification indicating that the vehicle door has been automatically locked; (b) receiving a second input instructing the vehicle to automatically carry out the passive operator departure process in a second mode when the vehicle is at one or more identified geographic locations, whereby the one or more identified geographic locations comprise lock function exempt location(s), wherein the second mode comprises at least one less door lock function than is carried out in the first mode; (c) obtaining data indicative of the presence of the vehicle at the lock function exempt location(s); and (d) configuring the vehicle to automatically detect if the vehicle is at a lock function exempt location when the operator exits the vehicle and, if not, to automatically carry out the passive operator departure process in the first mode and, if so, to carry out the passive operator departure process in the second mode following exit of an operator from the vehicle.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and methods described below enable a vehicle operator to configure a vehicle to carry out a passive operator departure process that can behave differently under different conditions specified by the operator. This allows the operator to specify a first (default) mode in which the vehicle automatically locks and optionally sounds a confirmatory honk when the operator leaves the vehicle and to specify one or more conditions, such as a particular location, which is exempt from the automatic locking and/or honking process. Thus, when the vehicle determines that it is at an exempt location, such as the operator's home, the passive operator departure process can operate in a second mode in which it forgoes one or more of the door lock functions (locking, alerting) that would otherwise be done if it were at a different location, such as in a municipal parking lot. The configuration of the passive operator departure process can be done, for example, through the vehicle's visual display or over the internet from a personal computer. The operator can navigate through the on-screen menus on the visual display to add new lock function exempt locations and/or to modify the settings associated with the exempt locations. For example, the operator can press an on-screen button to add the vehicle's current location as a new exempt location. The operator may be able to configure the settings that are specific to that exempt location. Some examples of modifying the settings would be selecting which lock functions to inhibit for all exempt locations; selecting the time of day to skip certain lock functions; and selecting which specific door lock functions to inhibit at certain exempt location(s).

The methods described below include methods for (i) running the passive operator departure process when a vehicle exit by the operator is detected and (ii) configuring the vehicle with the exempt locations so that it knows when to operate the vehicle operator departure process.

Communications System—

Figure 1:
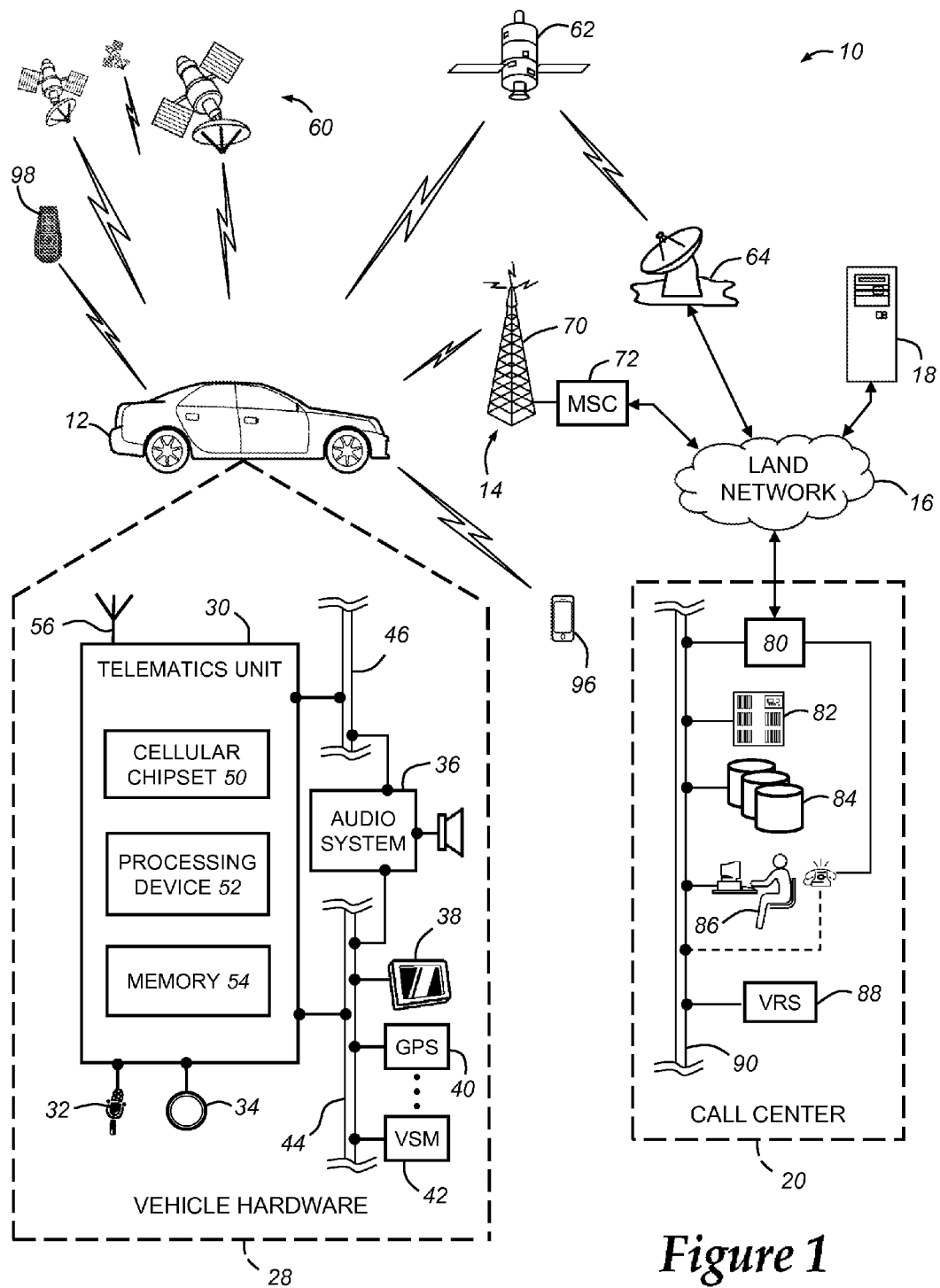
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the methods disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed methods as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX™, ZigBee™, Wi-Fi™ direct, Bluetooth™, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Vehicle 12 can also communicate wirelessly, via short range wireless communication (SRWC) such as the IEEE 802.11 or Bluetooth™ protocols mentioned above, with mobile device 96 or passive entry technology keyfob or other key, referred to herein as a passive entry key (PEK) 98. PEK 98 may comprise a body that includes one or more switches or buttons for user interaction; further, the body may carry a processor, memory, and a wireless transmitter for the SRWC. As will be appreciated by those skilled in the art, the PEK memory may store and transmit a cryptographic key used for PEK validation at the vehicle. Some functions of the PEK 98 with the vehicle 12 may be passive (e.g., not requiring manual input by the user) such as enabling unlocking of the vehicle doors when the PEK is in the proximity of the vehicle, while other functions may require active input, such as a button press on the PEK 98 to, for example, unlatch a trunk of the vehicle. In any event, transmission of a wireless signal that includes the cryptographic key may initiate or control one or more of the vehicle functions such as locking and unlocking doors, starting the vehicle, operating a vehicle alarm system, operating a vehicle trunk release, etc.

The mobile device 96 may include: hardware, software, and/or firmware enabling cellular telecommunications and SRWC as well as other mobile device applications. The hardware of the mobile device 96 may comprise: a processor and memory (e.g., non-transitory computer readable medium configured to operate with the processor) for storing the software, firmware, etc. The mobile device processor and memory may enable various software applications, which may be preinstalled or installed by the user (or manufacturer) (e.g., having a software application or graphical user interface or GUI). One implementation of a vehicle-mobile device application may enable a vehicle user to communicate with the vehicle 12 and/or control various aspects or functions of the vehicle—e.g., among other things, allowing the user to remotely lock/unlock vehicle doors, turn the vehicle ignition on or off, check the vehicle tire pressures, fuel level, oil life, etc. In some embodiments, mobile device 96 may be able to act as a passive entry key, such as PEK 98 described above. In addition, the application may also allow the user to connect with the call center 20 or call center advisors at any time.

Method—

Figure 2:
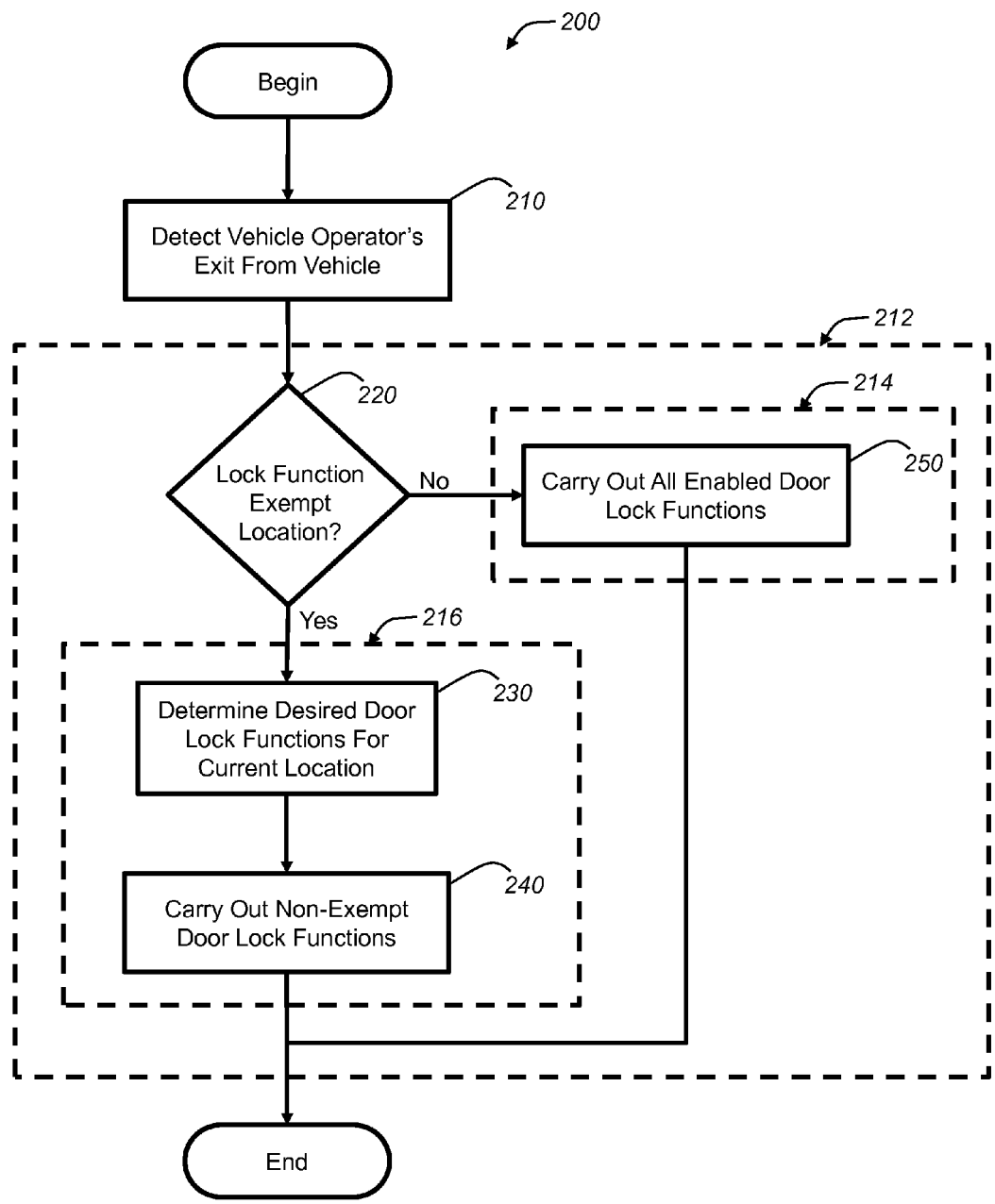
FIG. 2 is a flowchart illustrating a method of selectively carrying out a vehicle passive door lock function.

Turning now to FIG. 2, there is shown a method 200 of selectively carrying out a vehicle passive door lock function. This method is used as a security convenience feature for the operator and it operates to automatically carry out door locking and optionally provide a lock confirmation alert anytime the operator leaves the vehicle unless the vehicle is at a location where the operator has configured it to forgo either the locking or alerting functions. Thus, for example, the operator may configure the vehicle to automatically lock and arm a vehicle alarm system upon departure from the vehicle at all geographic locations except the operator's home. The method 200 may be implemented and carried out by the vehicle hardware 28 and, in particular, may be programmed into the telematics unit 30 or some other vehicle system module (VSM) 42, or may be distributed among multiple VSMs.

Method 200 begins by vehicle 12 detecting the vehicle operator's exit from vehicle 12. In one embodiment, determination of the vehicle operator's exit may be determined solely on detecting the departure of a passive entry key (PEK) from the vicinity of the vehicle. In other embodiments, determination of the operator's exit from the vehicle may be carried out as a two-step process: (1) determination that vehicle operator has exited vehicle 12; and (2) determination that the vehicle operator has moved away from, or left the vicinity of, vehicle 12. Vehicle 12 may determine that the vehicle operator has left the vehicle by detecting one or more of the following: that a door has been opened; that a door has been closed; that no occupant is in one or more seats of vehicle 12; that vehicle 12's ignition has been turned off; that PEK 98 is outside of vehicle 12; or any other similar actions or states that can be detected by vehicle 12. For example, vehicle 12 may determine that the vehicle operator has left the vehicle by detecting that a door has been opened, subsequently closed and that no occupant is in any of the seats of vehicle 12. Another example may include vehicle 12 detecting that the ignition has been turned off, that a door has been opened and subsequently closed, and that no seatbelt is fastened.

Next, to determine that the vehicle operator has moved away from, or left the vicinity of, vehicle 12, short range wireless communication (SRWC) technologies, such as those used for passive entry technology, may be used. These communication technologies can be used to detect the presence of PEK 98 or mobile device 96. As mentioned above, mobile device 96 may act as a passive entry key, such as PEK 98. Vehicle 12's detection of the presence of PEK 98 may indicate that the vehicle operator is within the vicinity of vehicle 12, while failure to detect the presence of PEK 98 may indicate that the vehicle operator is not in the vicinity of vehicle 12. Vehicle 12's detection of the presence of PEK 98 may be made by using an interrogating antenna that puts out an RF field that detects the PEK 98 if within the field range of the antenna, or by loss of Bluetooth™ connection between the PEK 98 and vehicle 12.

Although the two-step method provided above may be used in many embodiments to determine if a vehicle operator has exited the vehicle, this determination can also be made by vehicle 12 detecting the presence of PEK 98. For example, if vehicle 12 detects, or is in communication with, PEK 98, and then subsequently fails to detect, or losses communication with, PEK 98, then it may be determined that the vehicle operator has departed from vehicle 12. Again, this determination that the vehicle operator has left the vicinity of the vehicle may be used alone or in conjunction with vehicle components (e.g. door sensors, etc.) to decide that the vehicle operator has exited the vehicle. In the above described embodiments of step 210, it is presumed that the vehicle operator will possess PEK 98 upon exiting the vehicle and, therefore, vehicle 12's detection of the presence of PEK 98 provides an accurate indicator that the vehicle operator has exited from vehicle 12.

In response to detecting the vehicle operator's exit from the vehicle, the process begins a passive operator departure process 212 that selectively carries out one or more door lock functions. The passive operator departure process 212 controls what, if any, door lock functions are carried out upon exit of the operator. It may operate in a first mode representing a normal operating mode which may be used to automatically carry out the conventional set of door lock functions, including one or more of: locking the vehicle doors, arming an alarm system on the vehicle, providing an audible or visual confirmation of door locking, and any other desired function associated with locking and protection of the vehicle. As discussed below, the departure process may also operate in a second mode that is used for disabling or forgoing some or all of the automatic door lock functions in the event the vehicle is at a location for which the operator does not want the door lock functions to all be automatically carried out.

The departure process 212 begins at step 220 where the system determines whether vehicle 12 is at a lock function exempt location. A lock function exempt location is a geographic location for which the vehicle is specially configured to respond differently when at that location; for example, by forgoing one or more of the normal (default) lock functions following operator exit from the vehicle. An exempt location may be any geographic location and will typically be specified by the operator as a part of configuring the vehicle. There may be one such exempt location or many. Likely exempt locations include a home (residential) location or one or more other family member's home location(s), or any other location where the operator feels that the vehicle is sufficiently secure to not need locking. In other embodiments, the exempt location is not used to prevent vehicle locking, but to prevent, for example, an audible confirmatory alert which, under the circumstances (location/time of day or night), might otherwise be disturbing to others.

Vehicle 12 may identify whether it is currently located at a lock function exempt location by any of a number of suitable methods: for example, by comparison of coordinate values from GPS 40 with coordinates of an exempt location stored in memory 54; comparison of a detected wireless access point identifier with a stored one; detection of a known garage door actuation or transmitter command; or any other mechanism that indicates vehicle 12 is at a lock function exempt location.

In one embodiment, vehicle 12 uses GPS 40 to identify whether it is located at an exempt location. First, GPS 40 may identify vehicle 12's current latitude and longitude. Subsequently, processing unit 52 of telematics unit 30 will compare any stored exempt location latitude and longitude coordinates to the current location values provided by GPS 40. The stored exempt location latitude and longitude coordinates are previously recorded values that indicate the latitude and longitude of exempt locations. These stored values can be recalled from memory 54 by processing unit 52 in telematics unit 30. The result of this comparison will indicate whether vehicle 12 is at an exempt location. For example, if the result of one of these comparisons is only a small difference, it may be determined that vehicle 12 is at an exempt location. For example, if the distance between the two coordinate points is less than or equal to a certain threshold distance (e.g. 5 meters, 10 meters, etc.), then vehicle 12 is deemed to be at the exempt location. Another example may consists of comparing the total drivable or straight line distance between the two coordinate value pairs.

In another embodiment, vehicle 12 can determine that it is at an exempt location through detection by telematics unit 30 of a Wi-Fi™ or other SRWC signal coming from a particular Wi-Fi™ access point or other wireless device known to be located at an exempt location. In this embodiment, vehicle 12 may recall stored wireless identification (ID) information that can be used to identify the particular wireless device representing vehicle 12's presence at the exempt location. For example, this determination may be made by comparing the currently detected wireless device address (e.g., MAC address) or device name and one or more such device addresses or names that have been stored in vehicle memory. Any such unique or even potentially non-unique ID information can be used. Here, in telematics unit 30, processing unit 52 can recall from memory 54 all such stored identifiers that have been stored to indicate the presence of exempt locations. Upon the result of these comparisons, if a stored ID matches the currently detected ID, then it can be determined that vehicle 12 is at an exempt location.

Other implementations of step 220 may follow this same general process, detecting something indicative of the vehicle being at a geographic location that can then be compared to data stored on the vehicle or received by the vehicle (e.g., from a remote call center 20). This general process comprises the steps of (1) recalling information representing data indicative of vehicle 12's presence at all exempt location(s); (2) obtaining data indicative of vehicle 12's current location to be compared with recalled information; and (3) determining whether vehicle 12 is at an exempt location by comparing data from (1) and (2). Various types of identifying data will become apparent to those skilled in the art and may be used to carry this step 220.

If it is determined in step 220 that vehicle 12 is not at an exempt location, passive operator departure process 212 continues and operates in first mode 214, as seen in step 250. First mode 214 comprises carrying out one or more door lock functions. A first one of the door lock functions may be automatically locking the vehicle door, and a second one of the door lock functions may be automatically providing a notification that the vehicle door has been automatically locked. Another may be to arm an alarm system on the vehicle to guard against unwanted intrusions in the vehicle, or this alarm system arming may be considered a part of the door locking rather than as a separate step or function. A confirmatory notification that the vehicle door has been automatically locked and/or armed may include, but is not limited to, honking of the vehicle horn or actuating some other audible device, flashing of vehicle 12's headlights, flashing of vehicle 12's brake lights, or any action or combination of actions which serve to alert the vehicle operator. In one embodiment, this set of door lock functions includes the automatically locking of the vehicle doors, automatic arming of a vehicle alarm system, and automatically providing an audible notification (e.g., horn honk) indicating that the door locking and alarm system arming have been successfully carried out. The process 200 then ends.

If it is determined in step 220 that vehicle 12 is at an exempt location, then passive operator departure process 212 continues and operates in a second mode 216, wherein second mode 216 comprises carrying out at least one less door lock function than is carried out in first mode 214. In step 230, vehicle 12 determines what desired (non-exempt) door lock functions to carry out for the current location. For example, for a particular exempt location the operator may not want the doors to be automatically locked. Alternatively, the operator may want them to lock, but not to be confirmed by a horn honk even though the vehicle is configured to normally provide such confirmation at other (non-exempt) locations. The desired door lock functions may be the same for all exempt locations, or could vary by location.

In a first embodiment, vehicle 12 will use the lock function exempt location that was identified in step 220 to determine the desired door lock functions applicable for the current exempt location. As with the door lock functions used in the first mode, the door lock functions may be stored in memory 54 of telematics unit 30; in database 84 of call center 20; or in any location such that vehicle 12 will be able to access this information. For example, if the door lock functions that are to be carried out for the corresponding exempt location are stored in memory 54, they can be accessed by processing unit 52 in telematics unit 30. At this point, telematics unit 30 can determine which door lock functions to carry out.

In some embodiments, the door lock functions may be stored with their corresponding configuration data. In one embodiment, the configuration data may include certain times when to forgo some or all of the door lock functions. In this embodiment, telematics unit 30 can use processing unit 52 to recall all door lock functions for the current exempt location and their corresponding configuration data. Upon recall of this information, processing unit 52 can determine which door lock functions should be carried out. For example, if there is stored, for the current exempt location, the door lock function "honk" and its configuration data "23:00-07:00", vehicle 12 may then use an internal clock to determine if the current time is after 11:00 p.m. and before 7:00 a.m., and if so, to forgo door lock function "honk". In a similar embodiment, the configuration data stored for door lock function "Lock Doors" may be "In Garage". Here, processing unit 52 may communicate with a garage door actuator and/or other sensor that can detect vehicle 12's presence in a garage and, if vehicle 12 is determined to be in a garage, then vehicle 12 will forgo the "Lock Doors" door lock function.

In step 240, all door lock functions determined to be non-exempt (desired) for vehicle 12's current location will be carried out. In one embodiment, telematics unit 30 may send commands over bus 44 to vehicle 12's hardware components. These signals will inform the vehicle hardware components to carry out the desired door lock functions. These hardware components may include the audio system 36 and VSM 42.

Figure 3:
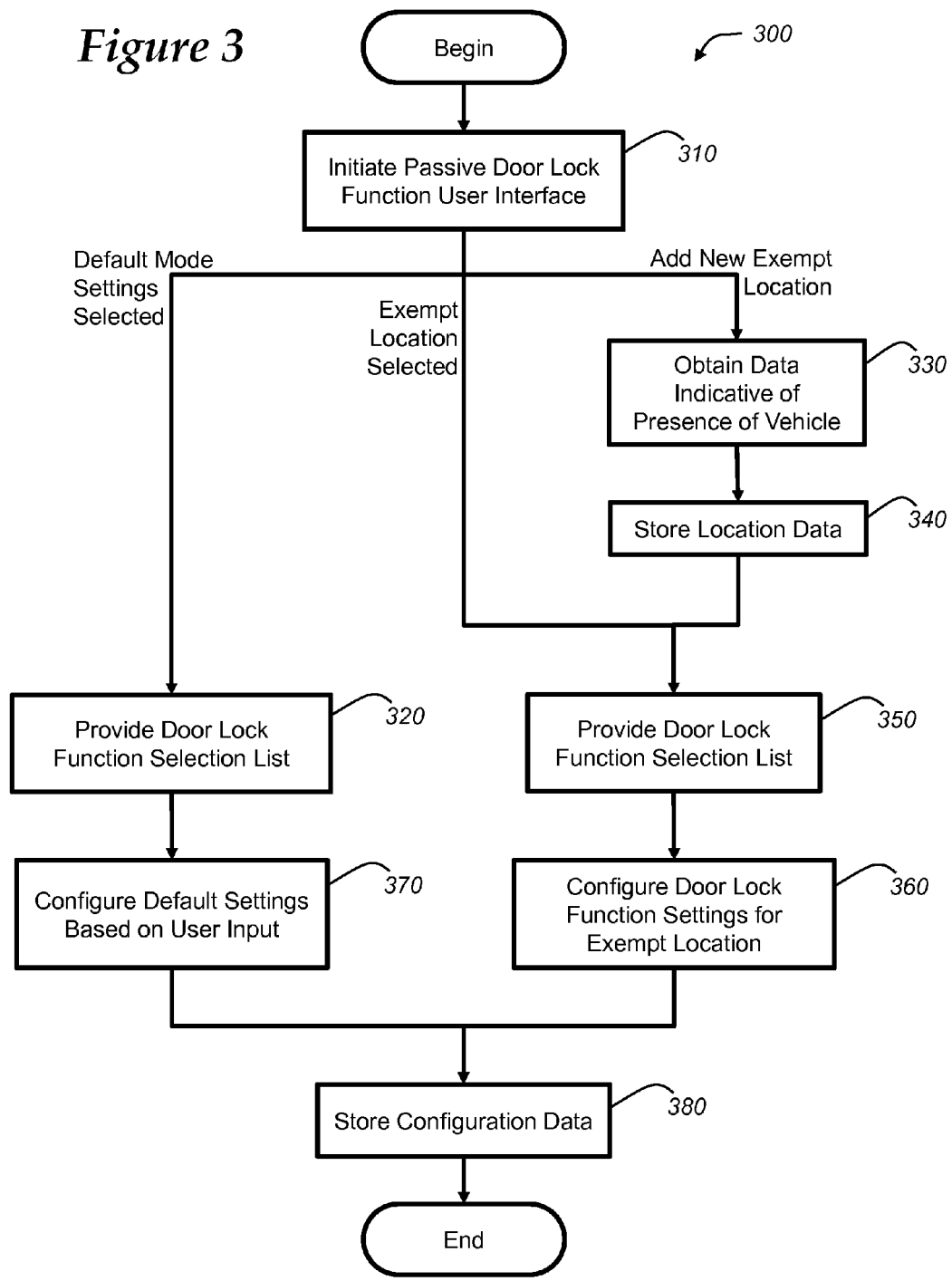
FIG. 3 is a flowchart illustrating a method of configuring a vehicle to carry out a vehicle passive door lock function.

Turning now to FIG. 3, there is shown a method 300 that can be used by the operator to configure the vehicle to selectively carry out the door locking functions. This generally involves allowing the operator to specify what door lock functions to perform in the normal (first) mode of the operator departure process and what door lock functions, if any, to carry out in the second mode, as well as to specify the exempt locations for which the second mode is to be used.

Method 300 presents one embodiment whereby vehicle 12 is configured for selectively carrying out a vehicle passive door lock function. Method 300 begins with step 310, wherein vehicle 12 initiates a user interface. Vehicle 12 may initiate the user interface upon receiving input from the operator via detecting a touch on visual display 38, detecting and/or interpreting a spoken command received by microphone 32, or another mechanism whereby vehicle 12 may receive an input. The user interface may be displayed on visual display 38, whereby the operator may configure the settings and behavior of vehicle 12's passive operator departure process 212 in first mode 214 and/or second mode 216. The user interface may include buttons, text, and other components that may allow the operator to configure the default (first mode 214) settings (see step 320) or exempt location (second mode 216) settings (see steps 330/350). Here, the user interface may list the names for all of the exempt locations and display a button for the default settings. Step 320 may be initiated by the operator pressing the default settings button. Step 350 may be initiated by the operator pressing on the desired exempt location name. The exempt location names may be either a default name provided by vehicle 12 or a name provided by the operator (e.g. Home, Lake Tahoe Condo, etc.). The operator may then select an exempt location by touching the name on visual display 38, speaking the name, etc. Additionally, the operator may press an on-screen button to add a new exempt location (see step 330).

Step 320 ensues when the default settings were selected on visual display 38. To select the default settings, the operator may press an on-screen button on visual display 38, say a command, etc. After vehicle 12 receives this input, vehicle 12 may display a default configuration screen on visual display 38, wherein the operator can enable/disable certain door lock functions for first mode 214. The default configuration screen may display a series of text, buttons, and/or other controls or indicators whereby the operator can modify door lock function settings for the default mode (first mode 214). In step 370, the operator may add/remove or enable/disable door lock functions for the default mode (first mode 214). For example, as mentioned above in connection with step 320, vehicle 12 may display on visual display 38 a list of all of the door lock functions, each with a corresponding toggle button. The operator can then press the toggle button(s) to enable or disable the associated door lock function. Alternatively, visual display 38 may list all door lock functions that will be currently carried out in first mode 214. The vehicle operator can then add or delete door lock functions from the default (first mode 214) through navigating the configuration screen. Navigation may be achieved through user and interaction with visual display 38's touch capabilities or through operator spoken commands.

If the operator selects a button or says a command indicating that the operator would like to add a new exempt location, then step 330 begins. In this step, data will be obtained that indicates vehicle 12's presence at a new desired exempt location. For example, using SRWC technologies, GPS 40, or any other mechanism, vehicle 12 will obtain data indicative of its location. Examples of how vehicle 12 will obtain this data include vehicle 12 obtaining its geographical coordinates from GPS 40, vehicle 12 detecting a Wi-Fi™ node and obtaining the Wi-Fi™ node's name and/or address, vehicle 12 detecting a Bluetooth™ device and obtaining the device's name and/or address, vehicle 12 being operatively connected to a known charging station, etc. Upon obtaining this data, vehicle 12 may automatically select the most suitable indicator(s) to use in recognition of vehicle 12 at this new exempt location. Alternatively, vehicle 12 may provide a list, whereby the operator can select which indicator(s) they would like vehicle 12 to use in recognizing the new exempt location. In addition to the selection of vehicle 12 presence/location indicator(s), the vehicle operator may wish to specify a name for the new exempt location. The vehicle operator may specify the name by using an on-screen keyboard displayed on visual display 38 or speaking the desired name into microphone 32.

After vehicle 12 obtains data indicative of its presence at a new exempt location, step 340 proceeds wherein vehicle 12 stores this data. The data that is stored may be the location data, such as the geographical coordinates or Wi-Fi™ node name, the new exempt location name specified by the user in step 330, and any other appropriate or desired metadata. This data may be stored by vehicle 12 in memory 54 of telematics unit 30; database 84 of call center 20; and/or any other location whereby vehicle 12 may access the data.

Step 350 continues if the vehicle operator presses on an exempt location name on visual display 38 or says an exempt location name into microphone 32. Alternatively, step 350 may proceed after the addition of a new exempt location (see steps 330-340). Step 350 is similar to step 320 mentioned above in that door lock functions are listed, and may be implemented in exactly the same manner. However, the difference is that here the operator is provided door lock functions for the selected exempt location or the new exempt location. This list may include all of the enabled default door lock functions, each with a corresponding toggle button. Alternatively, this list may include all of the door lock functions that are currently enabled for the selected exempt location.

After the door lock function selection list is presented in step 350, the operator can then configure the door lock function settings for the selected exempt location or the new exempt location. This step is similar to step 370 in that the operator may add/remove or enable/disable door lock functions. To configure the door lock function settings for the selected exempt location or the new exempt location, the operator can then touch the toggle button(s) to enable or disable the associated door lock function. Alternatively, visual display 38 may list all door lock functions that will be carried out in first mode 214. The operator can then add or delete door lock functions from the selected exempt location or the new exempt location through navigating the configuration screen. Navigation may be achieved through user interaction with visual display 38's touch capabilities or through vehicle operator spoken commands.

After passive operator departure process 212 settings are configured either in step 360 or 370, vehicle 12 will then store the new configuration data, as shown in step 380. The configuration data may be recorded by vehicle 12 in memory 54 of telematics unit 30; database 84 of call center 20; and/or any other location whereby vehicle 12 may access the data.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of selectively carrying out a vehicle passive door lock function, comprising the steps of:
    (a) detecting a vehicle operator's exit from a vehicle having at least one lockable door for passenger entry and exit, wherein the vehicle is configured to automatically carry out a passive operator departure process in a first mode, wherein the first mode comprises carrying out two or more door lock functions following the operator's exit, and wherein a first one of the door lock functions comprises automatically locking the vehicle door, and a second one of the door lock functions comprises automatically providing a notification indicating that the vehicle door has been automatically locked;
    (b) determining whether the vehicle is at a lock function exempt location;
    (c) automatically carrying out the passive operator departure process in the first mode when it is determined that the vehicle is not at the exempt location; and
    (d) automatically carrying out the passive operator departure process in a second mode following the operator's exit when it is determined that the vehicle is at the exempt location, wherein the passive operator departure process in the second mode comprises carrying out at least one of the door locking functions performed when in the first mode while foregoing the second one of the door lock functions, whereby no automatic notification is provided indicating that the vehicle door has been automatically locked.

2. The method set forth in claim 1, wherein the detecting of the operator's exit from the vehicle further comprises detecting movement of a passive entry control device out of proximity to the vehicle.

3. The method set forth in claim 1, wherein step (b) further comprises accessing current vehicle location data from a global positioning system (GPS) module on the vehicle and comparing the current vehicle location data to stored location data indicative of the lock function exempt location.

4. The method set forth in claim 1, wherein the lock function exempt location comprises a home location for the vehicle and wherein step (b) further comprises detecting data indicative of the vehicle being at the home location.

5. The method set forth in claim 1, wherein the lock function exempt location comprises a home garage location indicating that the vehicle is located in a garage of the operator's home, and wherein step (b) further comprises detecting data indicative of the vehicle being at the home garage location.

6. The method set forth in claim 5, wherein, in step (d), carrying out the passive operator departure process in the second mode further comprises leaving the vehicle unlocked when the vehicle is determined to be within the home garage location.

7. The method set forth in claim 1, wherein the second door lock function comprises an audible alert indicating that the vehicle door has been automatically locked.

8. A method of configuring a vehicle for selectively carrying out a vehicle passive door lock function, comprising the steps of:
(a) receiving a first input instructing the vehicle to carry out a passive operator departure process in a first mode, wherein the first mode comprises carrying out two or more door lock functions following exit of an operator from the vehicle, wherein a first one of the door lock functions comprises automatically locking the vehicle door, and a second one of the door lock functions comprises automatically providing a notification indicating that the vehicle door has been automatically locked;
(b) receiving a second input instructing the vehicle to carry out the passive operator departure process in a second mode following exit of an operator from the vehicle when the vehicle is at one or more identified geographic locations, whereby the one or more identified geographic locations comprise lock function exempt location(s), wherein the passive operator departure process in the second mode comprises carrying out at least one of the door locking functions performed when in the first mode while foregoing the second one of the door lock functions, whereby no automatic notification is provided indicating that the vehicle door has been automatically locked;
(c) obtaining data indicative of the presence of the vehicle at the lock function exempt location(s); and
(d) configuring the vehicle to automatically detect if the vehicle is at one of the one or more lock function exempt locations when the operator exits the vehicle and, if not, to automatically carry out the passive operator departure process in the first mode and, if so, to automatically carry out the passive operator departure process in the second mode following exit of the operator from the vehicle.

9. The method set forth in claim 8, wherein the second input is received at the vehicle via a touch screen input on a vehicle user interface or as speech received by a vehicle microphone.

10. The method set forth in claim 9, wherein step (c) further comprises obtaining location data indicative of the location of the vehicle at the time the second input was received.

11. The method set forth in claim 8, wherein the first input, the second input, or both, is received via a web portal or mobile device.

12. The method set forth in claim 8, wherein step (c) further comprises obtaining location data from a remote location.

13. A method of selectively carrying out a vehicle passive door lock function, comprising the steps of:
(a) receiving one or more location inputs via one or more human-machine interfaces included in a vehicle, wherein each of the one or more location inputs defines a lock function exempt location;
(b) detecting a vehicle operator's exit from the vehicle having at least one lockable door for passenger entry and exit, wherein the vehicle is configured to automatically carry out a passive operator departure process in a first mode following exit of an operator from the vehicle, wherein the first mode comprises automatically locking the vehicle door and automatically providing a notification indicating that the vehicle door has been automatically locked;
(c) determining whether the vehicle is at one of the defined lock function exempt locations;
(d) automatically carrying out the passive operator departure process in the first mode when it is determined that the vehicle is not at one of the lock function exempt locations; and
(e) automatically carrying out the passive operator departure process in a second mode following the operator's exit when it is determined that the vehicle is at the exempt location, wherein the second mode comprises automatically locking the vehicle door without providing the notification indicating that the vehicle door has been automatically locked.

14. The method of claim 13, wherein step (e) further comprises: determining a present time of day, carrying out the passive operator departure process in the first mode following the operator's exit when the present time of day is not within a predetermined time range, and carrying out the passive operator departure process in the second mode following the operator's exit when both it is determined that the vehicle is at the exempt location and the present time of day is within the predetermined time range.

15. The method of claim 14, further comprising the step of receiving an input indicating one or more times, wherein the one or more times are used to define the predetermined time range.

16. The method of claim 15, further comprising receiving an input for each of the lock function exempt locations, wherein each of the inputs indicates one or more times used to define a corresponding predetermined time range.

* * * * *